United States Patent
Radivojevic et al.

(10) Patent No.: US 12,107,339 B2
(45) Date of Patent: Oct. 1, 2024

(54) APPARATUS FOR REFLECTING ELECTROMAGNETIC WAVES AND METHOD OF OPERATING SUCH APPARATUS PRELIMINARY CLASS

(71) Applicant: Nokia Technologies Oy, Espoo (FI)

(72) Inventors: Zoran Radivojevic, Cambridge (GB); Mohammed Alloulah, Cambridge (GB); Howard Huang, New York, NY (US); Fahim Kawsar, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 551 days.

(21) Appl. No.: 17/018,154

(22) Filed: Sep. 11, 2020

(65) Prior Publication Data

US 2021/0080626 A1    Mar. 18, 2021

(30) Foreign Application Priority Data

Sep. 13, 2019  (EP) .................................... 19197189

(51) Int. Cl.
*H01Q 15/14*         (2006.01)
*G01S 13/75*         (2006.01)
(Continued)

(52) U.S. Cl.
CPC ............. *H01Q 3/20* (2013.01); *G01S 13/756* (2013.01); *H01Q 3/44* (2013.01); *H01Q 9/0407* (2013.01);
(Continued)

(58) Field of Classification Search
CPC ....... G02B 5/08; G02B 26/085; G01S 13/756; H01Q 3/20; H01Q 3/44; H01Q 9/0407;
(Continued)

(56) References Cited

U.S. PATENT DOCUMENTS 2,580,921 A   1/1952  Iams
4,361,911 A * 11/1982 Buser ...................... G01S 17/74
                                                          398/171
(Continued)

FOREIGN PATENT DOCUMENTS

| CN | 107394318 A  | 11/2017 |
| CN | 109792100 A  | 5/2019  |
| EP | 3021419 A1   | 5/2016  |
| WO | 2016193476 A1| 12/2016 |

OTHER PUBLICATIONS

Hu, Wenfei, et al. "Design and Measurement of Reconfigurable Millimeter Wave Reflectarray Cells With Nematic Liquid Crystal." IEEE Transactions on Antennas and Propagation 56.10 (2008): 3112-3117 (Year: 2008).*

(Continued)

*Primary Examiner* — Hoang V Nguyen
*Assistant Examiner* — Yonchan J Kim
(74) *Attorney, Agent, or Firm* — Mendelsohn Dunleavy, P.C.; Steve Mendelsohn

(57) ABSTRACT

Apparatus having at least one reflective surface configured to reflect electromagnetic waves, wherein a reflective response of at least one portion of the reflective surface with respect to the electromagnetic waves is electronically controllable, wherein the apparatus is configured to at least temporarily control the reflective response of the at least one portion of the reflective surface.

13 Claims, 5 Drawing Sheets

(51) Int. Cl.
   *H01Q 3/20* (2006.01)
   *H01Q 3/44* (2006.01)
   *H01Q 9/04* (2006.01)
   *H01Q 15/00* (2006.01)
   *H01Q 15/16* (2006.01)
   *H01Q 19/10* (2006.01)

(52) U.S. Cl.
   CPC ........... *H01Q 15/002* (2013.01); *H01Q 15/14* (2013.01); *H01Q 15/141* (2013.01); *H01Q 15/147* (2013.01); *H01Q 15/148* (2013.01); *H01Q 15/165* (2013.01); *H01Q 19/106* (2013.01)

(58) Field of Classification Search
   CPC .... H01Q 15/002; H01Q 15/14; H01Q 15/141; H01Q 15/147; H01Q 15/148; H01Q 15/165; H01Q 19/106; H01Q 19/062; H04B 10/071; H04B 10/40
   See application file for complete search history.

(56) References Cited

U.S. PATENT DOCUMENTS

| | | | |
|---|---|---|---|
| 5,355,241 A | 10/1994 | Kelley | |
| 5,767,802 A | 6/1998 | Kosowsky et al. | |
| 5,819,164 A * | 10/1998 | Sun | G01S 13/756 342/6 |
| 5,841,392 A * | 11/1998 | Kishimoto | G01S 13/76 342/6 |
| 5,952,922 A * | 9/1999 | Shober | G06K 7/0008 340/10.5 |
| 6,137,623 A | 10/2000 | Roberson et al. | |
| 6,233,088 B1 | 5/2001 | Roberson et al. | |
| 10,581,162 B2 | 3/2020 | Nishimura | |
| 2005/0017913 A1 | 1/2005 | Orfei et al. | |
| 2005/0105914 A1 | 5/2005 | Chen | |
| 2005/0163511 A1 | 7/2005 | Cicchiello | |
| 2008/0061941 A1* | 3/2008 | Fischer | H04L 9/3226 340/10.1 |
| 2009/0015498 A1 | 1/2009 | Deng et al. | |
| 2012/0229355 A1 | 9/2012 | Scolamiero et al. | |
| 2013/0113644 A1 | 5/2013 | Nakagawa et al. | |
| 2014/0070921 A1 | 3/2014 | Jansseune | |
| 2014/0266955 A1 | 9/2014 | Yi et al. | |
| 2015/0029051 A1 | 1/2015 | Driscoll et al. | |
| 2015/0069133 A1* | 3/2015 | Qian | G06K 19/022 235/492 |
| 2015/0145726 A1 | 5/2015 | Stambovsky | |
| 2015/0319616 A1 | 11/2015 | Kim | |
| 2016/0092706 A1* | 3/2016 | Deyle | H04B 5/0031 340/10.1 |
| 2016/0134006 A1 | 5/2016 | Ness et al. | |
| 2017/0325087 A1 | 11/2017 | Drokov et al. | |
| 2017/0338556 A1 | 11/2017 | Yi et al. | |
| 2017/0373371 A1 | 12/2017 | Gabriel | |
| 2018/0053996 A1 | 2/2018 | Nishimura | |
| 2018/0062246 A1 | 3/2018 | Hershey et al. | |
| 2018/0109002 A1* | 4/2018 | Foo | H01Q 19/19 |
| 2018/0356342 A1 | 12/2018 | Laycock | |
| 2019/0033682 A1* | 1/2019 | Kafaie Shirmanesh | G02F 1/29 |
| 2021/0080626 A1 | 3/2021 | Radivojevic et al. | |
| 2021/0328677 A1* | 10/2021 | Pasquali | H04B 10/40 |
| 2022/0006202 A1 | 1/2022 | Alloulah et al. | |

OTHER PUBLICATIONS

Carrasco, Eduardo, et al. "Gate-controlled mid-infrared light bending with aperiodic graphene nanoribbons array." Nanotechnology 26.13 (2015): 134002. (Year: 2015).*
Chandra, Kishor, et al. "Performance Analysis of IEEE 802.11ad MAC Protocol." IEEE Communications Letters 21.7 (2017): 1513-1516.
Charvat, Gregory L. "Small and Short-Range Radar Systems." 1st Edition. CRC Press, Inc., Boca Raton, FL, USA (2014): 1-385.
Chiriyath, Alex R., et al. "Radar-Communications Convergence: Coexistence, Cooperation, and Co-Design." IEEE Transactions on Cognitive Communications and Networking 3.1 (2017): 1-12.
Surface Acoustive Wave (SAW) Touch Screen, baanto.com, 2017 [retrieved on Jun. 15, 2017] Retrieved from the Internet: <URL: https://web.archive.org/web/20170615202131/http://baanto.com/surface-acoustive-wave-saw-touch-screen> (3 pages).
IEEE, "Part 11: Wireless LAN Medium Access Control (MAC) and Physical Layer (PHY) Specifications." Standard 802.11 (2016): 1-3532.
Mavridou, Marina, et al. "Dynamically Reconfigurable High Impedance and Frequency Selective Metasurfaces Using Piezoelectric Actuators." IEEE Transactions on Antennas and Propagation 64.12 (2016): 5190-5197.
Yaman, Yavuz, et al. "Reducing the LOS Ray Beamforming Setup Time for IEEE 802.11ad and IEEE 802.15.3c." MILCOM 2016—2016 IEEE Military Communications Conference, Baltimore, MD (2016): 448-453.
Yeo, Hui-Shyong, et al. "RadarCat: Radar Categorization for Input & Interaction." Proceedings of the 29th Annual Symposium on User Interface Software and Technology. ACM, New York, NY, USA (2016): 833-841.
First Examination Report for corresponding Indian application No. 202014039474; dated Jul. 23, 2021 (6 pages).
Communication pursuant to Article 94(3) EPC for corresponding European application No. 19197189.4; dated Aug. 16, 2021 (11 pages).
Second Office Action for corresponding Chinese application No. 202010961393.8; dated Aug. 26, 2022 (9 pages) Machine Translation.
First Office Action for corresponding Chinese application No. 202010961393.8; dated Nov. 4, 2021 (18 pages).
International Search Report and Written Opinion for corresponding International application No. PCT/EP2018/079863; dated Sep. 18, 2019 (17 pages).
Extended European Search Report for corresponding European application No. 19197189.4; dated Jul. 16, 2020 (16 pages).
Partial European Search Report for corresponding European application No. 19197189.4; dated Mar. 20, 2020 (14 pages).
Hu, Wenfei, et al. "Design and Measurement of Reconfigurable Millimeter Wave Reflectarray Cells With Nematic Liquid Crystal." IEEE Transactions on Antennas and Propagation 56.10 (2008): 3112-3117.
Carrasco, Eduardo, et al. "Gate-controlled mid-infrared light bending with aperiodic graphene nanoribbons array." Arxiv.org preprint, arXiv:1412.1061 (2014): 1-11.
Karmoose, Mohammed, et al. "Using mm-Waves for Secret Key Establishment." Arxiv.org preprint, arXiv:1803.08188v3 (2019): 1-8.
Mayrhofer, René, et al. "On the Security of Ultrasound as Out-of-band Channel." 2007 IEEE International Parallel and Distributed Processing Symposium. Rome, Italy (2007): 1-6.
Mayrhofer, René, et al. "Security by Spatial Reference: Using Relative Positioning to Authenticate Devices for Spontaneous Interaction." 9th International Conference on Ubiquitous Computing. Innsbruck, Austria (2007): 199-216.
Mayrhofer, René. "Ubiquitous Computing Security: Authenticating Spontaneous Interactions" Habilitation Thesis, University of Vienna (2008): 1-191.
Steinmetzer, Daniel, et al. "Authenticating the Sector Sweep to Protect Against Beam-Stealing Attacks in IEEE 802.11ad Networks." mmNets '18: Proceedings of the 2nd ACM Workshop on Millimeter Wave Networks and Sensing Systems, New Delhi, India (2018): 3-8.
Saxena, Nitesh, et al. "Treat 'Em Like Other Devices: User Authentication of Multiple Personal RFID Tags." Proceedings of the 5th Symposium on Usable Privacy and Security, SOUPS 2009, Mountain View, California, USA, (2009): 1-2.

(56) References Cited

OTHER PUBLICATIONS

Zhao, Nan, et al. "Authentication in Millimeter-Wave Body-Centric Networks Through Wireless Channel Characterization." IEEE Transactions on Antennas and Propagation 65.12 (2017): 6616-6623.

* cited by examiner

APPARATUS FOR REFLECTING ELECTROMAGNETIC WAVES AND METHOD OF OPERATING SUCH APPARATUS PRELIMINARY CLASS

CROSS-REFERENCE TO RELATED APPLICATIONS

This application claims the benefit of the filing date of EP application no. 19197189.4 of 13 Sep. 2019, the teachings of which are incorporated herein by reference.

TECHNICAL FIELD

The disclosure relates to techniques for reflecting electromagnetic waves.

BACKGROUND

It is known to use electromagnetic waves for wireless data exchange.

SUMMARY

The scope of protection sought for various embodiments of the invention is set out by the independent claims.

The embodiments and features, if any, described in this specification that do not fall under the scope of the independent claims are to be interpreted as examples useful for understanding various embodiments of the invention.

Exemplary embodiments relate to an apparatus comprising at least one reflective surface configured to reflect electromagnetic waves, wherein a reflective response of at least one portion of said reflective surface with respect to said electromagnetic waves is electronically controllable, wherein said apparatus is configured to at least temporarily control said reflective response of said at least one portion of said reflective surface. This advantageously enables to modulate electromagnetic waves impinging upon said at least one portion of said reflective surface while reflecting said electromagnetic waves. According to further exemplary embodiments, by means of said modulation, information may be provided to the reflected electromagnetic waves that may be evaluated, for example by a receiver, i.e. a receiver of a transceiver that has emitted said electromagnetic waves impinging upon said at least one portion of said reflective surface and/or another receiver.

According to further exemplary embodiments at least one portion of said reflective surface is movable, wherein said apparatus is configured to at least temporarily drive a movement of said at least one movable portion of said reflective surface. It may therefore be stated that, according to some embodiments, the movement of said at least one movable portion of said reflective surface causes a change in the reflective response of said reflective surface, hence modulating incident electromagnetic waves.

According to further exemplary embodiments, reflective properties of said at least one portion of said reflective surface with respect to said electromagnetic waves are electronically controllable, wherein said apparatus is configured to at least temporarily control said reflective properties of said at least one portion of said reflective surface. Therefore, it may be stated that, according to some embodiments, changes in said reflective properties of said at least one portion of said reflective surface with respect to said electromagnetic waves cause a change in the reflective response of said reflective surface, hence modulating incident electromagnetic waves. As an example, at least some embodiments related to at least temporarily controlling said reflective properties of said at least one portion of said reflective surface do not require a movement, particularly physical movement, of said at least one portion of said reflective surface.

According to further exemplary embodiments, said modulation of reflected electromagnetic waves may be effected by a movement of said at least one movable portion of said reflective surface relative to said receiver for receiving the reflected electromagnetic waves. According to further exemplary embodiments, said modulation may also be referred to as "kinetic modulation". According to further exemplary embodiments, said kinetic modulation may e.g. be in the order of tens of microns, e.g. ranging between 10 μm (micrometer) and 100 μm.

According to further exemplary embodiments, such movement may be effected by at least temporarily moving the whole reflective surface (or a target system comprising said reflective surface such as e.g. an antenna or antenna element or a radio device). According to further exemplary embodiments, such movement may be effected by at least temporarily moving only said at least one portion of said reflective surface, while at least one other portion of said reflective surface may not be moved.

According to further exemplary embodiments, said modulation of reflected electromagnetic waves may be effected by a temporal variation of said electronically controllable reflective properties of a or said at least one portion of said reflective surface with respect to said electromagnetic waves. According to further exemplary embodiments, said reflective properties may e.g. comprise an impedance of said at least one portion of said reflective surface.

According to further exemplary embodiments, it is also possible to modulate (reflected) electromagnetic waves by both at least temporarily moving and at least temporarily varying said reflective properties of said at least one portion of said reflective surface.

According to further exemplary embodiments, a controllable ("programmable") reflector array may be provided, which may comprise a plurality of reflective surfaces that are either movable and/or reflective properties of which are electronically controllable.

According to further exemplary embodiments, said apparatus is configured to perform one or more of reflect, transmit, receive electromagnetic waves that have a frequency of 3 gigahertz, GHz, or greater. According to further exemplary embodiments, said apparatus may e.g. be configured to transmit and/or receive and/or reflect electromagnetic waves in the millimeter wave range. Electromagnetic waves denoted as "millimeter waves" are electromagnetic waves having a wavelength ranging from 1 millimeter, mm, to 10 mm, corresponding to frequencies in a range between 300 GHz and 30 GHz. While some embodiments may be particularly suited for modulating and reflecting millimeter waves, the principle according to the embodiments is also applicable to electromagnetic waves having higher or lower frequencies than said millimeter waves.

According to further exemplary embodiments, said at least one portion of said reflective surface comprises at least one of the following components: electrically conductive material, metal (e.g., aluminum, copper, silver, gold, and the like), electrically isolating material with an electrically conductive surface (e.g., glass and/or plastic material, e.g. plastic sheets, with an electrically conductive coating, e.g. metal coating).

According to further exemplary embodiments, said apparatus may form a part of or may represent an antenna for said electromagnetic waves, particularly for millimeter waves. As an example, according to further exemplary embodiments, said at least one reflective surface may represent or form a part of an antenna element, e.g. of a patch antenna.

According to further exemplary embodiments, said apparatus comprises at least one of: a) electromechanical actuator for driving a movement of said at least one movable reflective surface portion, b) a reflective element comprising liquid crystal, c) a reflective element comprising graphene elements, particularly graphene nanoribbons.

According to further exemplary embodiments, said electromechanical actuator comprises at least one of: a) an actuator for providing haptic feedback, particularly a vibration motor (e.g., an electric motor having an eccentric rotating mass attached to its shaft), b) a piezoelectric element and/or a piezoelectric film. According to further exemplary embodiments, the piezoelectric element may carry an element comprising said at least one reflective surface. According to further exemplary embodiments, a surface of the piezoelectric element or film may form said at least one reflective surface, wherein said surface of the piezoelectric element may e.g. be metallized or comprise an electrically conductive material.

According to the inventors' analysis, according to further exemplary embodiments, a reflective element comprising liquid crystal may be used to implement an electrically controllable surface portion of said at least one reflective surface wherein said reflective properties may be influenced by controlling an operation of said liquid crystal.

According to further exemplary embodiments, said reflective element comprising liquid crystal comprises two electrodes for receiving a control voltage and a liquid crystal cavity between said two electrodes. By applying and/or varying the control voltage to said electrodes, the reflective properties of the reflective element comprising liquid crystal may be controlled, e.g. for modulating reflected electromagnetic waves.

According to further exemplary embodiments, liquid crystals of said reflective element may consist of elongated rod-like molecules and may exhibit different electrical characteristics depending e.g. on how an electromagnetic field is incident on the molecules owing to anisotropy.

According to further exemplary embodiments, the orientation of a liquid crystal bulk can be changed by external electric fields (e.g., said control voltage to the electrodes) and/or by encapsulating surface anchoring.

According to further exemplary embodiments, a microstrip line topology may be used to build a "programmable" reflective element on a metasurface. According to further exemplary embodiments, the principal structure may be composed of a substrate, two biasing electrodes, a liquid crystal cavity, encapsulated e.g. in said microstrip line topology mentioned above.

According to further exemplary embodiments, a part (e.g., an upper part) of the substrate may be completely metalized to form a ground plane. According to further exemplary embodiments, the liquid crystal (LC) cavity may be formed between the substrate and the ground plane with the aid of spacers. According to further exemplary embodiments, a modulated external electric field to control the bulk orientation can be maintained simply by applying modulated voltage between said two electrodes confining the LC. According to further exemplary embodiments, in the absence of a bias voltage or for the pre-alignment of the molecules, surface anchoring may play a part. In other words, without any bias voltage, according to further exemplary embodiments, molecules may align perpendicular to the field between the electrodes. In this case, the effective relative permittivity of the liquid crystal bulk is equal to εper.

According to further exemplary embodiments, when a bias voltage is applied to said electrodes, molecules begin to turn leading to a variation in the effective permittivity of the liquid crystal bulk. If the voltage is increased further, molecules may orient along the bias field lines and parallel to the field and hence is almost equal to εpar. According to further exemplary embodiments, by modulating the biasing voltage, it is possible to rearrange the crystal orientation and overall effective permittivity of the reflective surface yielding in coding possibility for e.g. reflected mm-waves from such a surface (portion) containing LC crystals.

According to the inventors' analysis, according to further exemplary embodiments, a reflective element comprising graphene elements, particularly graphene nanoribbons (ribbon-shaped structures or strips, respectively, with a width of e.g. less than 50 nanometers (nm)), may be used to implement an electrically controllable surface portion of said at least one reflective surface wherein said reflective properties may be influenced by controlling an operation of said graphene elements.

According to further exemplary embodiments, said reflective element comprising graphene elements comprises a plurality of graphene nanoribbons.

According to further exemplary embodiments, graphene plasmonic nanostructures may enable subwavelength confinement of electromagnetic (EM) waves, e.g. from the mid-infrared down to the terahertz (THz) frequencies. By exploiting the spectrally varying EM wave scattering phase at the vicinity of the resonant frequency of the plasmonic nanostructure, according to further exemplary embodiments, it is possible to control the angle of reflection of an incoming EM wave.

According to further exemplary embodiments, it is proposed to provide an aperiodic array of graphene nanoribbons of varying widths as multiplied wavelength of the operating EM waves. According to further exemplary embodiments, each nanoribbon may form a plasmonic resonator, which can effectively produce a scattering phase (between 0 and $-\pi$). According to further exemplary embodiments, the graphene nanoribbons are made and/or arranged on a SiO2 (silicon dioxide) substrate, preferably with an interconnecting electrode serving as a "top gate" for inducing high doping in graphene by introducing biasing potential and possibility to program the scattering phase of a graphene plasmonic resonator, i.e. to code it by modulating the biasing signal.

According to further exemplary embodiments, a reflective element with an electronically controllable impedance may be provided, which may e.g. comprise a plurality of varactor diodes and/or PIN diode switches and/or ferro-electric films and/or MEMS (micro electro mechanical system) devices and/or a combination of these elements. These are further examples for implementing said at least one reflective surface with electronically controllable reflective properties according to further exemplary embodiments.

Further exemplary embodiments relate to a method of operating an apparatus comprising at least one reflective surface configured to reflect electromagnetic waves, wherein a reflective response of said at least one portion of said reflective surface with respect to said electromagnetic waves is electronically controllable, wherein said apparatus at least temporarily controls said reflective response of said at least one portion of said reflective surface.

According to further exemplary embodiments at least one portion of said reflective surface is movable, wherein said apparatus at least temporarily drives a movement of said at least one movable portion of said reflective surface.

According to further exemplary embodiments, reflective properties of said at least one portion of said reflective surface with respect to said electromagnetic waves are electronically controllable, wherein said apparatus at least temporarily controls said reflective properties of said at least one portion of said reflective surface.

Further exemplary embodiments relate to a radio device comprising a radio interface for wirelessly exchanging data with at least one further device, wherein said radio device comprises at least one apparatus according to the embodiments, wherein said radio device is configured to: establish a first communications channel with said at least one further device using said electromagnetic waves, establishing a second communications channel with said at least one further device by at least temporarily controlling said reflective response of said at least one portion of said reflective surface.

According to further exemplary embodiments said radio device is configured to: establish a first communications channel with said at least one further device using said electromagnetic waves, establish a second communications channel with said at least one further device by at least temporarily driving a movement of said at least one movable portion of said reflective surface.

According to further exemplary embodiments said radio device is configured to at least temporarily control said reflective properties of said at least one portion of said reflective surface. In other words, said first communications channel may be similar to a conventional RF communications channel where an RF carrier signal is modulated according to a modulation and/or coding scheme (MCS). By contrast, said second communications channel is enabled by said modulation of reflected electromagnetic waves, said reflections occurring at said at least one portion of said at least one reflective surface, wherein said modulation is e.g. effected by moving said at least one portion of said at least one reflective surface and/or by influencing reflective properties of said at least one portion of said at least one reflective surface.

According to further exemplary embodiments, said radio device is configured to: determine, using said first communications channel, a first secret, which is a shared secret common to the radio device and said further device, to determine, depending on said first secret, a second secret, and to transmit first information characterizing said second secret to said further device using said second communications channel. As an example, said first information may be identical to said second secret or may be derived therefrom, may e.g. be a part of said second secret.

According to further exemplary embodiments, said determining of said first secret, which may e.g. represent a shared session key, may comprise a, preferably pre-committed, ephemeral key agreement procedure.

According to further exemplary embodiments, said second secret may e.g. represent a one-time secret or key, and may e.g. be deterministically derived from said first secret. According to further exemplary embodiments, said second secret may be determined by applying a hash function, e.g. SHA (secure hash algorithm)-256 or the like, to the first secret. As an example, the so obtained hash value (or a part thereof) may be used as said second secret.

Further exemplary embodiments relate to a method of operating a radio device comprising a radio interface for wirelessly exchanging data with at least one further device, wherein said radio device comprises at least one apparatus according to at the embodiments, wherein said radio device establishes a first communications channel with said at least one further device using said electromagnetic waves, and establishes a second communications channel with said at least one further device by at least temporarily controlling said reflective response of said at least one portion of said reflective surface.

According to further exemplary embodiments, said radio device establishes a first communications channel with said at least one further device using said electromagnetic waves, and establishes said second communications channel with said at least one further device by at least temporarily driving a movement of said at least one movable portion of said reflective surface.

According to further exemplary embodiments, said radio device at least temporarily controls said reflective properties of said at least one portion of said reflective surface.

Further exemplary embodiments relate to a system comprising a first radio device, wherein said first radio device is configured according to the embodiments, e.g. corresponds with the radio device according to the embodiments, and at least one second radio device, said second radio device comprising a transmitter configured to transmit electromagnetic waves (e.g., in the millimeter wave range) to said first radio device, a receiver configured to receive reflected modulated electromagnetic waves from said first radio device, wherein said second radio device is configured to wirelessly exchange data with said first radio device using said first communications channel and/or said second communications channel.

According to further exemplary embodiments, said first radio device is configured to: determine, using said first communications channel, a first secret, which is a shared secret common to the first radio device and said second radio device; to determine, depending on said first secret, a second secret; and to transmit first information characterizing said second secret to said second radio device using said second communications channel, wherein said second radio device is configured to receive, using said second communications channel, said first information from said first radio device, and to evaluate said received first information depending on said first secret. According to further exemplary embodiments, said evaluating may e.g. comprise applying a hash function to the first (i.e., shared) secret and comparing an output of said hash function with said first information.

Further exemplary embodiments relate to method of operating a system comprising a first radio device, wherein said first radio device is configured according to the embodiments (e.g., according to claim 9 and/or 10), and at least one second radio device, said second radio device comprising a transmitter configured to transmit electromagnetic waves to said first radio device, a receiver configured to receive reflected modulated electromagnetic waves from said first radio device, wherein said second radio device wirelessly exchanges data with said first radio device using said first communications channel and/or said second communications channel.

According to further exemplary embodiments, said first radio device determines, using said first communications channel, a first secret, which is a shared secret common to the first radio device and said second radio device, determines, depending on said first secret, a second secret, and transmits first information characterizing said second secret to said second radio device using said second communications channel, wherein said second radio device receives, using said second communications channel, said first information from said first radio device, and evaluates said received first information depending on said first secret.

Further exemplary embodiments relate to a use of said apparatus according to the embodiments and/or of said method(s) according to the embodiments and/or of said radio device according the embodiments and/or of said system according to the embodiments for at least one of: a) performing encryption-based applications, b) authentication, c) two-factor authentication, d) secure content sharing, e) automating services, e.g. external services.

Further advantageous embodiments are provided by the dependent claims.

BRIEF DESCRIPTION OF THE FIGURES

Further features, aspects and advantages of the illustrative embodiments are given in the following detailed description with reference to the drawings in which:

FIG. 1A schematically depicts a side view of an apparatus 100 according to exemplary embodiments. The apparatus 100 comprises at least one reflective surface 110a configured to reflect electromagnetic (EM) waves A1, wherein a reflective response of at least one portion of said reflective surface 110a with respect to said electromagnetic waves A1 is electronically controllable, wherein said apparatus 100 is configured to at least temporarily control said reflective response of said at least one portion of said reflective surface 110a, e.g., depending on a control signal CS. This advantageously enables to modulate electromagnetic waves A1 impinging upon said at least one portion of said reflective surface 110a while reflecting said electromagnetic waves A1.

Figure 1A:
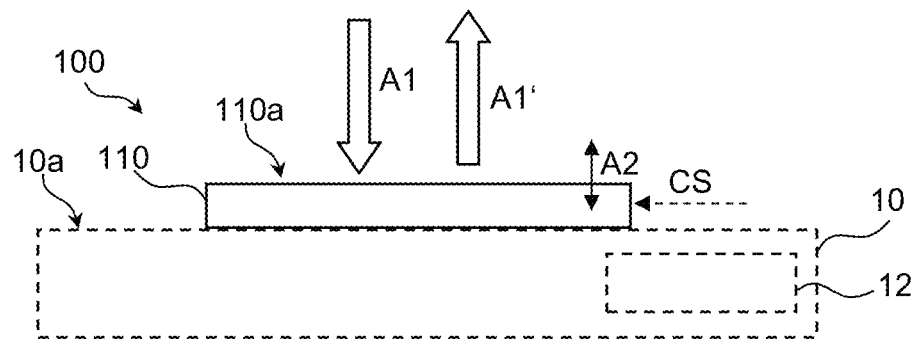
FIG. 1A schematically depicts a side view of an apparatus according to exemplary embodiments, FIG. 1B schematically depicts a side view of an apparatus according to further exemplary embodiments, FIG. 2 schematically depicts a side view of an electromechanical actuator according to further exemplary embodiments, FIG. 3 schematically depicts a side view of an electromechanical actuator according to further exemplary embodiments, FIG. 4A schematically depicts a side view of an electromechanical actuator according to further exemplary embodiments, FIG. 4B schematically depicts a top view of the actuator of FIG. 4A, FIG. 5 schematically depicts a simplified block diagram of a system according to further exemplary embodiments, FIG. 6A schematically depicts a simplified block diagram of a system according to further exemplary embodiments in a first operational state, FIG. 6B schematically depicts a simplified block diagram of the system of FIG. 6A in a second operational state, FIG. 7 schematically depicts a simplified block diagram of an exemplary application of the system according to FIG. 6A, 6B, FIG. 8A schematically depicts a side view of a reflective element according to further exemplary embodiments in a first operational state, FIG. 8B schematically depicts said reflective element of FIG. 8A in a second operational state, FIG. 9 schematically depicts a perspective view of a reflective element according to further exemplary embodiments, FIG. 10 schematically depicts exemplary, non-limiting, examples of spectrograms according to further exemplary embodiments, and FIG. 11A to 11C each schematically depict a simplified flow chart of a method according to further exemplary embodiments.

According to further exemplary embodiments, at least one portion of said reflective surface 110a is movable, cf. the double arrow A2, wherein said apparatus 100 is configured to at least temporarily drive a movement A2 of said at least one movable portion of said reflective surface 110a. As an example, according to further preferred embodiments, the apparatus 100 may comprise a piezoelectric element 110, a surface of which is reflective for said EM waves A1, which surface forms said reflective surface 110a as mentioned above. This advantageously enables to modulate said incident electromagnetic waves A1 impinging upon said at least one portion of said reflective surface 110a while reflecting said electromagnetic waves, whereby modulated EM waves A1' are obtained. In other words, said modulation of EM waves A1, A1' may be effected by a movement of said at least one movable portion of said reflective surface 110a relative to a receiver for receiving the reflected electromagnetic waves A1'. It may therefore be stated that the movement of said at least one movable portion of said reflective surface causes a change in the reflective response of said reflective surface, hence modulating the incident electromagnetic waves A1'.

According to further exemplary embodiments, said modulation may also be referred to as "kinetic modulation". According to further exemplary embodiments, said kinetic modulation may e.g. be in the order of tens of microns, e.g. ranging between 10 μm (micrometer) and 100 μm. This means that a spatial displacement (for example vertical in FIG. 1A) of the reflective surface 110a as effected by the piezoelectric element 110 may range between 10 μm and 100 μm. According to further exemplary embodiments, a control signal CS such as e.g. a voltage may be applied to the piezoelectric element 110 to effect said "kinetic" modulation.

According to further exemplary embodiments, the apparatus 100 may be arranged on and/or attached to a carrier or support and/or surface 10a of a target system 10. According to further exemplary embodiments, the target system 10 may be any object or device 10 (mobile or fixed) for which it may be desirable to reflect incident electromagnetic waves A1 while modulating said incident electromagnetic waves A1 in accordance with the principle according to the embodiments.

According to some exemplary embodiments, the device 10 may be a radio device, e.g. first radio device, optionally comprising a radio interface 12 for wirelessly exchanging (e.g., transmitting and/or receiving) data with at least one further device, e.g. second radio device, (not shown in FIG. 1A).

According to further exemplary embodiments, said radio device 10 may comprise a radio interface 12 having a transmitter and/or a receiver and/or a transceiver (combined transmitter and receiver) for wirelessly exchanging data with said at least one further device.

According to further exemplary embodiments, said apparatus 100 (FIG. 1A) may form a part of or may represent an antenna for said electromagnetic waves A1, A1', particularly for millimeter waves. As an example, according to further exemplary embodiments, said at least one reflective surface 110a may represent or form a part of an antenna element, e.g. of a patch antenna, e.g. of the (first) radio device 10.

Figure 1B:
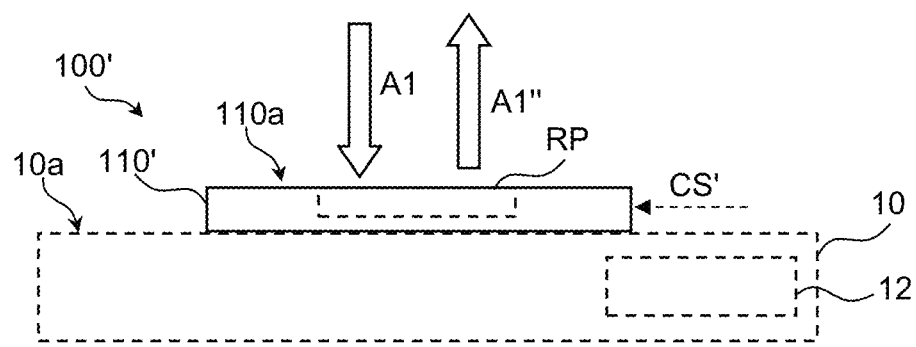

According to further preferred embodiments, the apparatus 100', cf. FIG. 1B, comprises at least one reflective surface 110a configured to reflect EM waves A1, wherein reflective properties RP of a or said at least one portion of said reflective surface 110a with respect to said EM waves A1 are electronically controllable, wherein said apparatus 100' is configured to at least temporarily control said reflective properties RP of said at least one portion of said reflective surface 110a. This advantageously enables to modulate said incident electromagnetic waves A1 impinging upon said at least one portion of said reflective surface 110a while reflecting said electromagnetic waves, whereby modulated EM waves A1" are obtained, wherein, in contrast to the exemplary embodiment of FIG. 1A, no (physical) movement of said reflective surface 110a is required. In this regard, object 110' may be a reflective element the reflective properties RP of which may e.g. electronically be controlled, for example by a control signal CS'.

According to further preferred embodiments, and similar to the configuration 100 of FIG. 1A, the apparatus 100' of FIG. 1B may also form part of and/or may be integrated into a target device 10, as explained above.

According to further exemplary embodiments, said modulation of reflected electromagnetic waves A1" may be effected by a temporal variation of said electronically controllable reflective properties RP of said at least one portion of said reflective surface 110a with respect to said electromagnetic waves A1. According to further exemplary embodiments, said reflective properties RP may e.g. comprise an impedance of said at least one portion of said reflective surface 110a.

Therefore, it may be stated that changes in the reflective properties RP of said at least one portion of said reflective surface 110a with respect to said electromagnetic waves A1 cause a change in the reflective response of said reflective surface, hence modulating the incident electromagnetic waves A1.

According to further exemplary embodiments, it is also possible to modulate (reflected) electromagnetic waves by both at least temporarily moving A2 (FIG. 1A) and at least temporarily varying said reflective properties RP (FIG. 1B) of said at least one portion of said reflective surface 110a. I.e., according to further preferred embodiments, an apparatus may be provided which enables both a kinetic modulation (e.g., similar to FIG. 1A) and a modulation by altering said reflective properties RP of said reflective surface 110a (e.g., similar to FIG. 1B). As an example, the element 110' of FIG. 1B may additionally be provided with a piezoelectric element (110, cf. FIG. 1A) to effect said kinetic modulation, i.e. movement of the element 110', while, by means of said control signal CS', its reflective properties RP may also be controlled for effecting a modulation of said EM waves A1.

According to further exemplary embodiments, by means of said modulation (either kinetic (FIG. 1A) or caused by variation of reflective properties RP (FIG. 1B) or combinations thereof or other ways of providing said controllable reflective response), information may be provided to the reflected electromagnetic waves A1', A1" that may be evaluated, for example by a receiver (not shown in FIG. 1A, 1B), e.g. a receiver of a transceiver that has emitted said electromagnetic waves A1 impinging upon said at least one portion of said reflective surface and/or another receiver. This information may e.g. be provided to (or generated by) the apparatus in form of the control signal(s) CS, CS'.

According to further exemplary embodiments, movement of said reflective surface 110a (FIG. 1A) may be effected by at least temporarily moving the whole reflective surface 110a, as depicted by FIG. 1A, or a target system 10 comprising said reflective surface 110a such as e.g. an antenna or antenna element, or even a complete (preferably mobile) radio device 10. According to further exemplary embodiments, movement may also be effected by at least temporarily moving only said at least one portion of said reflective surface 110a, e.g., while at least one other portion (not shown) of said reflective surface 110a may not be moved. This configuration may e.g. be used when the apparatus 100, 100' forms part of an antenna system having a plurality of antenna elements, wherein at least one of said antenna elements may represent said movable reflective surface 110a, while further antenna elements are not movable in this sense.

According to further exemplary embodiments, said apparatus 100, 100' is configured to perform one or more of reflect, transmit, receive electromagnetic waves A1, A1', A1" that have a frequency of 3 gigahertz, GHz, or greater. According to further exemplary embodiments, said apparatus may e.g. be configured to transmit and/or receive and/or reflect electromagnetic waves in the millimeter wave range. Electromagnetic waves denoted as "millimeter waves" are electromagnetic waves having a wavelength ranging from 1 millimeter, mm, to 10 mm, corresponding to frequencies in a range between 300 GHz and 30 GHz. While some embodiments may be particularly suited for modulating and reflecting millimeter waves, the principle according to the embodiments is also applicable to electromagnetic waves having higher or lower frequencies than said millimeter waves.

According to further exemplary embodiments, said at least one portion of said reflective surface 110a (FIG. 1A, 1B) comprises at least one of the following components: electrically conductive material, e.g. metal (e.g., aluminum, copper, silver, gold, and the like), electrically isolating material with an electrically conductive surface (e.g., glass and/or plastic material, e.g. plastic sheets, with an electrically conductive coating, e.g. metal coating).

According to further exemplary embodiments, said apparatus comprises at least one of: a) electromechanical actuator for driving a movement of said at least one movable reflective surface portion, b) a reflective element comprising liquid crystal, c) a reflective element comprising graphene elements, particularly graphene nanoribbons.

Figure 2:
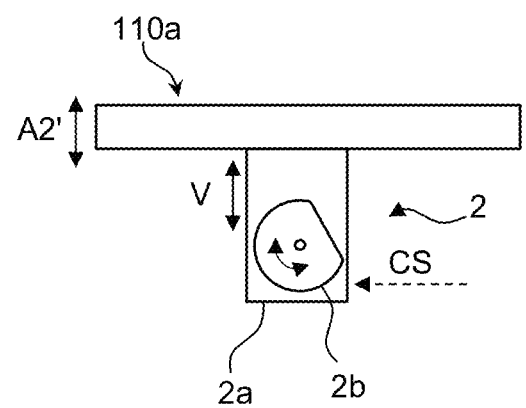

In this respect, FIG. 2 schematically depicts a simplified side view of a reflective surface 110a a movement A2' of which is driven by an actuator for providing haptic feedback, e.g. a vibration motor 2 (e.g., an electric motor 2a having an eccentric rotating mass 2b attached to its shaft). The vibrations V generated by said vibration motor 2 drive the movement A2' of said reflective surface 110a thus enabling a kinetic modulation of incident EM waves A1 (FIG. 1A).

According to further exemplary embodiments, the actuator 2, which may e.g. be a vibration motor arranged in the radio device 10 (FIG. 1A, e.g. instead of the piezoelectric element 110), may advantageously be used to effect the kinetic modulation A2 according to exemplary embodiments, and to perform haptic feedback signaling, e.g. to a user of the radio device 10.

Figure 10:
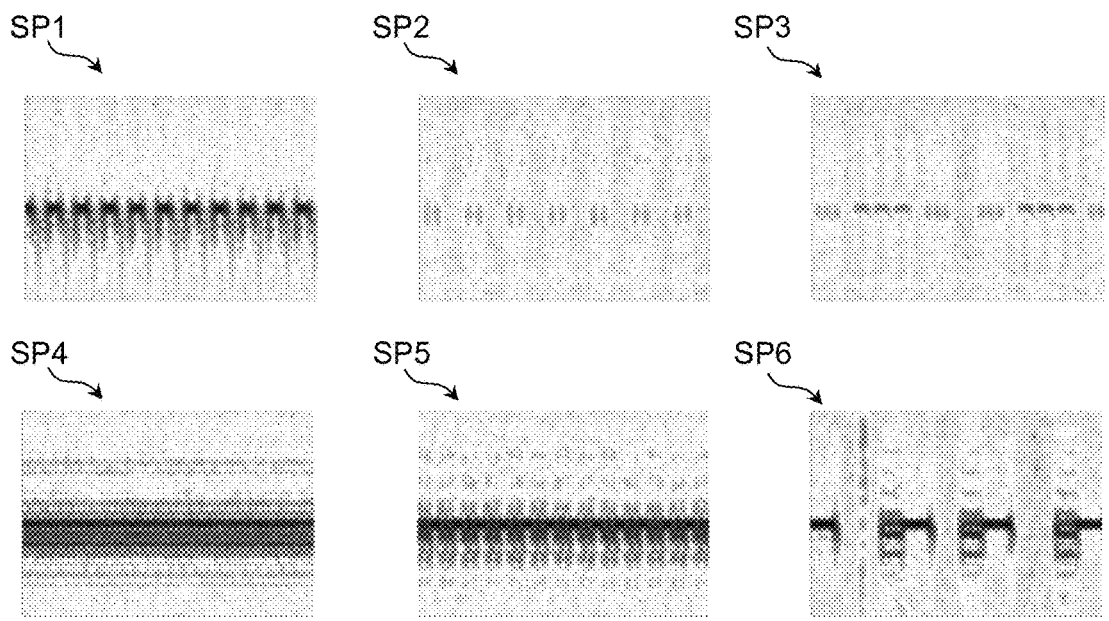

FIG. 10 schematically depicts exemplary, non-limiting, examples of spectrograms SP1, SP2, SP3, SP4, SP5, SP6 according to further exemplary embodiments, as can be obtained by kinetic modulation of EM waves A1' (FIG. 1A) by means of actuator 2 as exemplarily depicted by FIG. 2. A horizontal axis (not shown) of each spectrogram corresponds with a time interval ranging between 0 seconds and ten seconds, wherein a respective vertical axis corresponds with a frequency range between 100 Hertz (Hz) and 200 Hz.

It can be seen that different control signals CS for the actuator 2 (FIG. 2), which correspond to different frequency encoded vibration patterns as applied by the actuator 2 to the reflective surface 110a (FIG. 2), lead to different spectrograms SP1, . . . , SP6, which may e.g. be evaluated (and distinguished) by a receiver of the so (kinetically) modulated EM waves A1' (FIG. 1A).

Figure 3:
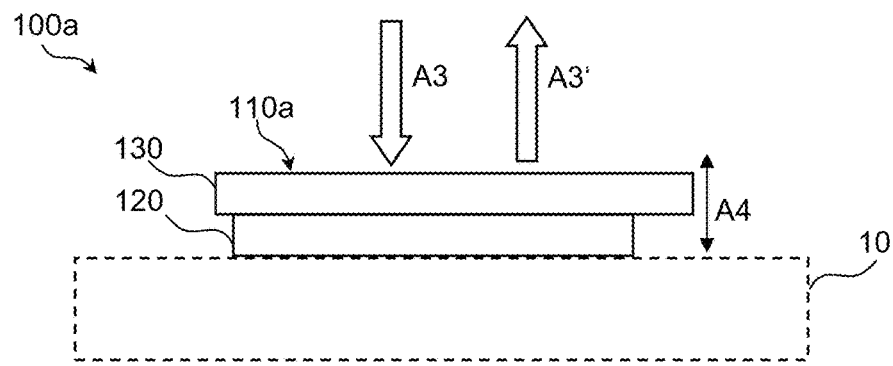

According to further exemplary embodiments, cf. the apparatus 100a of FIG. 3, said apparatus 100a comprises at least one movable reflector element 130 having said at least one reflective surface 110a, wherein an electromechanical actuator 120 is configured to drive an oscillation or any other type of movement A4 of said at least one movable reflector element 130 and/or of said at least one reflective surface 110a. In other words, by driving said movement of said at least one reflector element 130, the movement of said at least one reflective surface 110a for reflecting electromagnetic waves A3, A3' and thus a corresponding kinetic modulation may be effected.

According to further exemplary embodiments, said at least one reflector element 130 comprises at least one of the following components: electrically conductive material, metal (e.g., aluminum, copper, silver, gold, and the like), electrically isolating material with an electrically conductive surface (e.g., glass and/or plastic material, e.g. plastic sheets, with an electrically conductive coating, e.g. metal coating)).

Figure 4A:
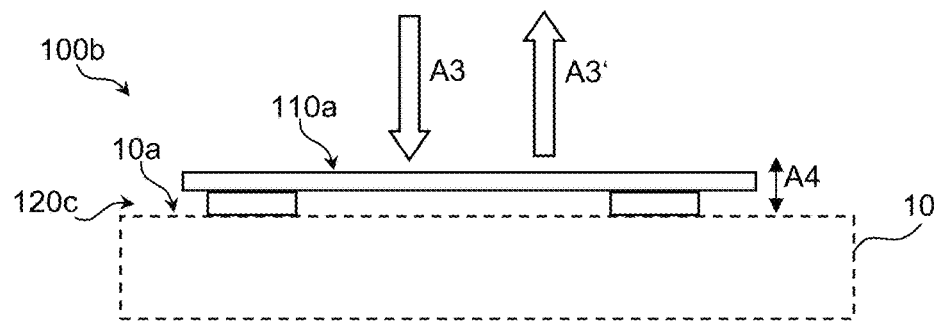
Figure 4B:
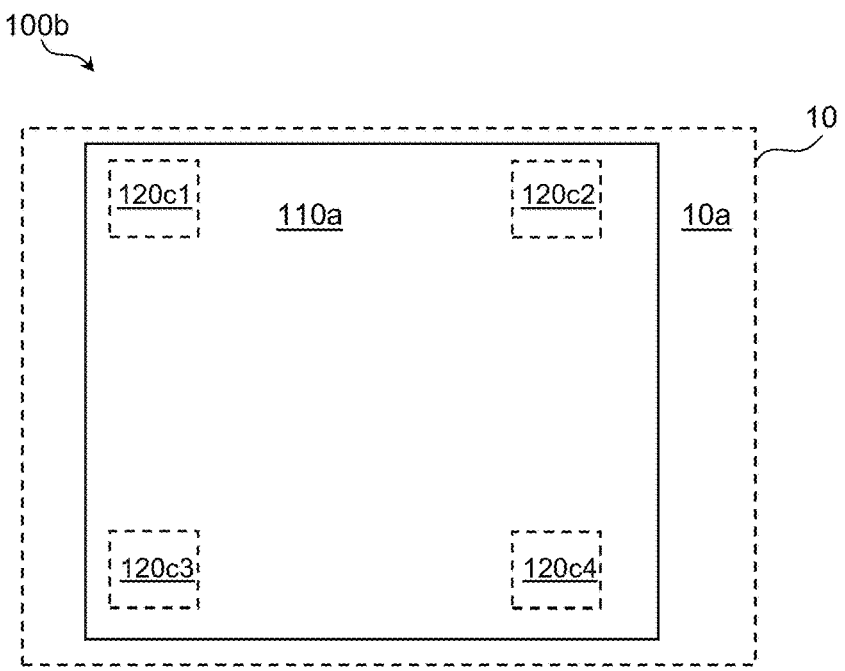

FIG. 4A schematically depicts a side view of an apparatus 100b according to further exemplary embodiments, and FIG. 4B schematically depicts a top view of said apparatus 100b. The apparatus 100b comprises four actuators 120c1, 120c2, 120c3, 120c4 collectively denoted with reference sign 120c in FIG. 4A. A movable reflective surface 110a (or a reflector element having a reflective surface 110a) is connected to, e.g. arranged on top of, the actuators 120c and may thus be moved as explained above to effect a mechanical (i.e., kinetic) modulation of incident electromagnetic waves A3, whereby modulated electromagnetic waves A3' are obtained. Optionally, on the surface 10a, an electrically conductive layer may be provided, e.g. a ground plane. Alternatively, the surface 10a may form said ground plane.

While according to some exemplary embodiments, vibration motors 2 (FIG. 2) may be used to effect kinetic modulation, according to further preferred embodiments, larger enhancements to the "kinetic data rate" (e.g., a data rate that can be obtained by kinetic modulation of said EM waves A3 (FIG. 4A)) can be achieved using piezoelectric elements (FIG. 4A, 4B) or piezo films of higher bandwidth and faster response.

Figure 5:
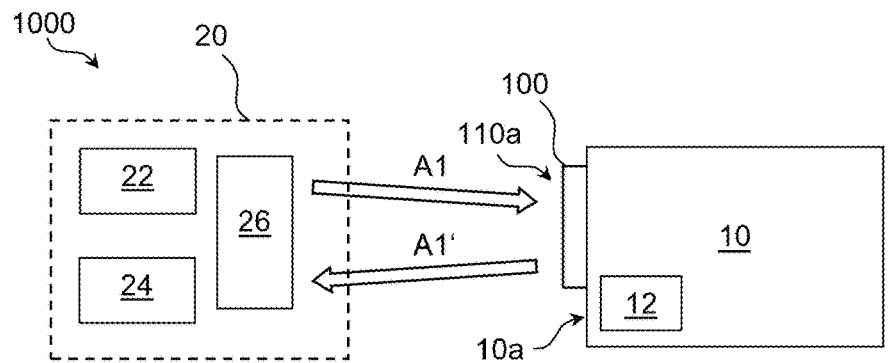

FIG. 5 schematically depicts a simplified block diagram of a system 1000 according to further exemplary embodiments. The system 1000 comprises a first radio device 10 with an apparatus 100 as explained above with reference to FIG. 1A. The system 1000 further comprises a second radio device 20, said second radio device comprising a transmitter 22 configured to transmit electromagnetic waves A1 to said first radio device 10, a receiver 24 configured to receive reflected modulated electromagnetic waves A1' from said first radio device, and an optional antenna system 26.

According to further exemplary embodiments, the apparatus 100 of the first radio device 10 may be programmed to move (e.g., vibrate), its reflective surface 110a with information-bearing vibrating patterns with, for example, phase-shift or on-off keying or amplitude modulation, whereby said kinetic modulation of the EM waves A1 may be effected, which may be detected by said second radio device 20 and may e.g. be evaluated, e.g. to recover said information of said information-bearing vibrating patterns. According to further exemplary embodiments, an exemplary distance between the two radio devices 10, 20 may e.g. be about 2.5 meter.

Figure 6A:
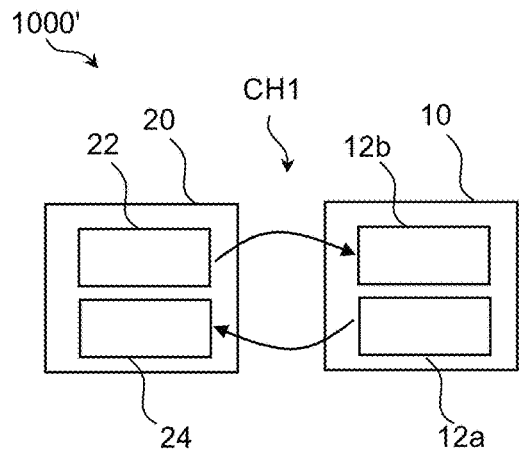
Figure 6B:
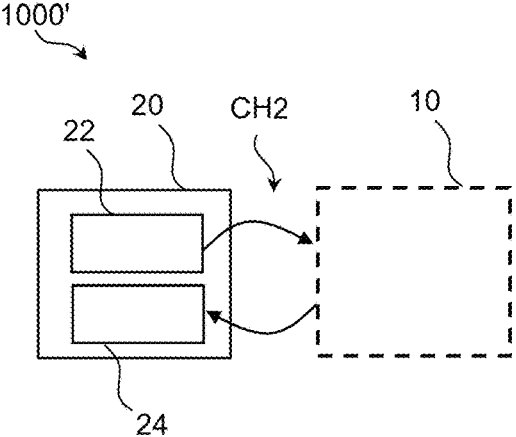

FIG. 6A schematically depicts a simplified block diagram of a system 1000' according to further exemplary embodiments in a first operational state, and FIG. 6B schematically depicts said system 1000' in a second operational state. The devices 10, 20 of FIG. 6A, 6B may e.g. correspond with the first and second radio device 10, 20 of FIG. 5, wherein element 12a of FIG. 6 e.g. represents a mm wave transmitter of said radio interface 12 (FIG. 5) and wherein element 12b of FIG. 6 e.g. represents a mm wave receiver of said radio interface 12 (FIG. 5).

According to further exemplary embodiments, the apparatus 100 (FIG. 5) may e.g. at least partly be integrated into said transmitter 12a and/or said receiver 12b.

According to further exemplary embodiments, said first radio device 10 (FIG. 6A) is configured to establish a first communications channel CH1 with said second radio device 20 using said electromagnetic waves A1, A1', e.g. mm waves, cf. FIG. 6A. This is also exemplarily depicted by step 200 of the simplified flow chart of FIG. 11A.

Further, said first radio device 10 is configured to establish a second communications channel CH2 (cf. FIG. 6B) with said second radio device 20 by at least temporarily controlling said reflective response of said at least one portion of said reflective surface 110a. This is also exemplarily depicted by step 202 of the flow chart of FIG. 11A.

According to further exemplary embodiments, said first radio device 10 is configured to establish said second communications channel CH2 (cf. FIG. 6B) with said second radio device 20 by at least temporarily driving a movement of said at least one movable portion of said reflective surface 110a (FIG. 1A), and/or at least temporarily controlling said reflective properties RP (FIG. 1B) of said at least one portion of said reflective surface 110a.

In other words, said first communications channel CH1 may be similar or identical to a conventional RF communications channel where an RF carrier signal, e.g. in the mm wave range, is modulated according to a modulation and/or coding scheme (MCS), e.g. by a respective transmitter 22, 12a. By contrast, said second communications channel CH2 is enabled by said (for example, kinetic) modulation of reflected electromagnetic waves A1', said reflections occurring at said at least one portion of said at least one reflective surface 110a, wherein said modulation is e.g. effected by controlling said reflective response, e.g. by moving said at least one portion of said at least one reflective surface and/or by influencing reflective properties RP of said at least one portion of said at least one reflective surface. This is symbolized in FIG. 6B by the dashed rectangle 10.

Figure 11A:
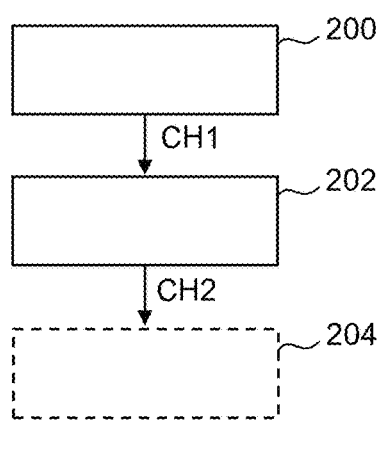

According to further exemplary embodiments, both communications channels CH1, CH2 may be used simultaneously, e.g. for data exchange, between said devices 10, 20, also cf. the optional step 204 of FIG. 11A, or at least in a temporally at least partly overlapping fashion.

Figure 7:
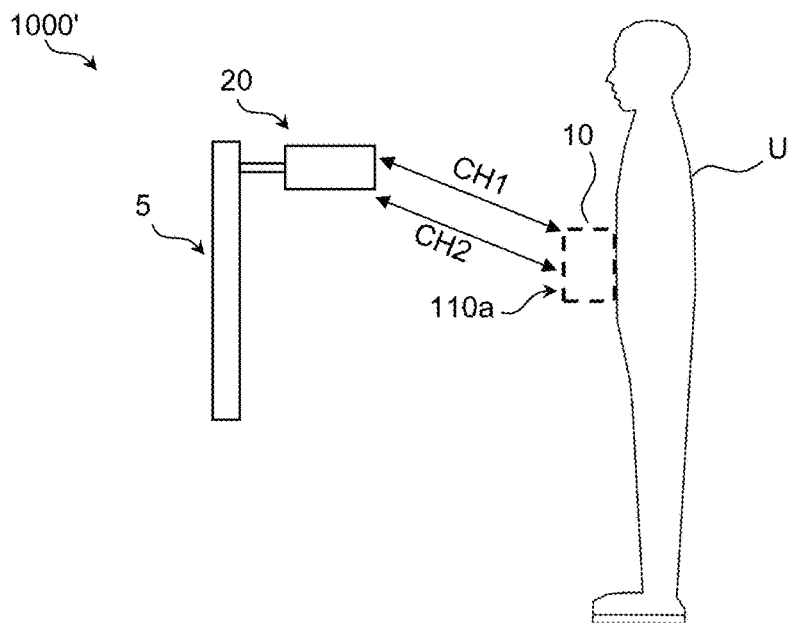

FIG. 7 schematically depicts a simplified block diagram of an exemplary application scenario of the system 1000' according to FIG. 6A, 6B. In the exemplary scenario of FIG. 7, it is proposed to use the modulated reflective surface 110a (cf. FIG. 1A, which surface may also be denoted as reconfigurable antenna surface—"metasurface") at mm-wave frequencies for establishing an auxiliary communication channel (e.g., the second channel CH2 as explained above with respect to FIG. 6A, 6B) and to utilize this auxiliary or second communications channel CH2 (FIG. 6B) for authentication and/or service discovery, e.g. when a user U (FIG. 7) is in the vicinity of discoverable services and/or devices 20, 5 offering discoverable services.

Figure 8A:
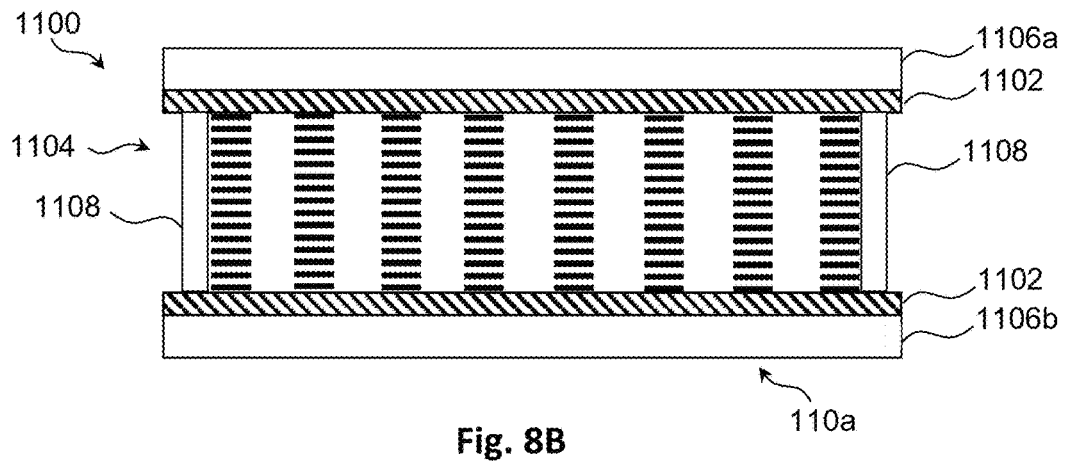
Figure 8B:
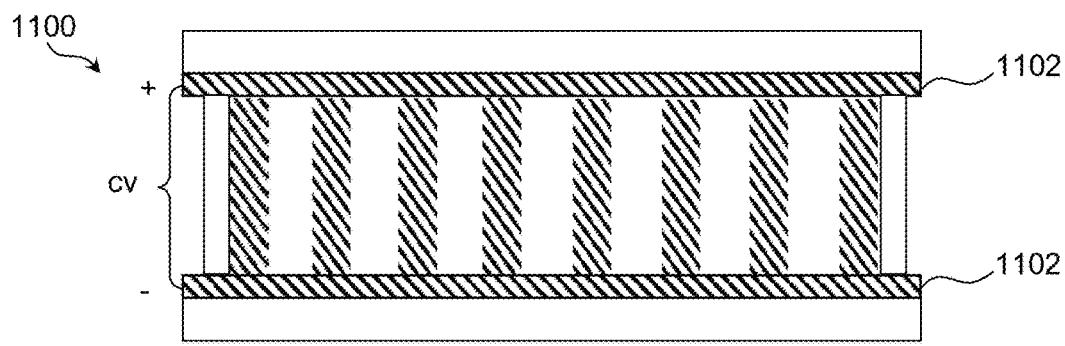
Figure 9:
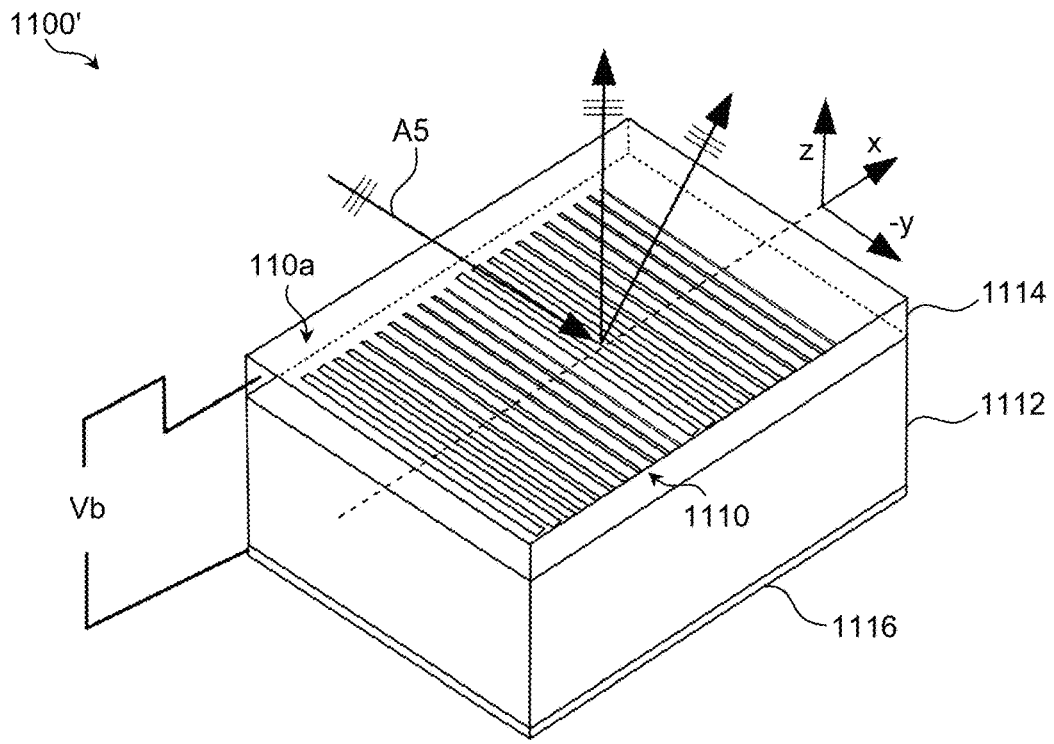

As explained above with respect to FIGS. 1 to 4B, and as will be explained further below with reference to FIG. 8A, 8B, 9, the modulation principle for implementing said second communications channel CH2 may, according to further exemplary embodiments, e.g. be based on physical (movement, vibration) and/or electro-chemical and/or structural electromagnetic material performance modifications.

According to further exemplary embodiments, using the modulation mechanisms e.g. according to FIG. 1A, 1B, with the reflective surface 110a, one or more reconfigurable "antenna scatterers" may be provided, which may e.g. be arranged in a principal antenna aperture of an antenna of e.g. the first radio device 10 (and/or form a part of said antenna). As explained above, said reflective surface 110a or said "antenna scatterers", respectively, can be electronically tuned, cf. the control signals CS, CS' (FIG. 1A, 1B). According to further exemplary embodiments, one or more reflective elements 110 (FIG. 1A), 110' (FIG. 1B) may comprise one or more discrete elements such as vibrating modules, varactor diodes, PIN diode switches, ferro-electric films, liquid crystals, MEMS devices or materials such as graphene. This e.g. enables to provide a configurable "metasurface" that can be electronically controlled, ("shaped"), e.g. to enable programmable reflective features which can be coded in the sense of the abovementioned (kinetic) modulation, i.e. to provide said second communications channel CH2 (FIG. 6B), which may e.g. be used for a device authentication process.

According to further exemplary embodiments, one or more steps of the following aspects A_1 to A_5 may be performed, e.g. in a scenario as exemplarily depicted by FIG. 7:

Aspect A_1: Set up for the second radio device 20 (and optionally for an external service object 5). The second radio device 20, which may e.g. form a mm-wave communication module, may be connected to an external object 5 that provides a service (e.g., monitor mirroring for transmitting a screen content of a first display of a first device 10 to a second display of a second device 5, e.g. from a mobile phone to a television set, and/or opening a door, and/or giving access to smart-home appliances, and/or giving permission to operate external devices, etc.).

Aspect A_2: An initial connection and/or localization of said first radio device 10, which may e.g. be a mobile phone or smartphone ("user device"). When the user device 10 is in the vicinity of the second device 20, a connection is made via a first, conventional communication channel CH1 (FIG. 6A), and, optionally, a relative location of the user device 10 with respect to the second device 20 is determined using this first channel CH1. According to further exemplary embodiments, the location of the user device 10 may also be estimated using mm-wave sensing.

Aspect A_3: Communication, i.e. data exchange, over the first communication channel CH1, i.e. said "mm-wave channel". Optionally, if the location of the user device 10 meets the requirements for enabling the service, a first secret, i.e. a deterministic key or a secret code, is communicated from the second device 20 to the user device 10 over the first communication channel CH1.

Aspect A_4: Sensing over the second communications channel CH2 ("auxiliary kinetic channel"). The deterministic key as received according to preceding aspect A_3 is converted to a data sequence which is physically modulated on the reflective surface 110a of the user device 10. The second radio device 20 receives the reflected mm-wave signal associated with said second communications channel CH2, e.g. to detect the reflective surface's data sequence, and optionally also to estimate the user device's location. According to further exemplary embodiments, techniques for said reflectance modulation include vibration (FIG. 1A), liquid crystal (cf. FIG. 8A, 8B below), ferro-electric and graphene film (cf. FIG. 9 below) or diode and MEMS based modulators.

Aspect A_5: Authentication and service enabling. The user device 10 is successfully authenticated, and the service is enabled if the following two conditions are met: the detected sequence of preceding Aspect A_4 can be matched to the deterministic of preceding aspect A_4, and, optionally, the spatial location of the user device 10, as e.g. determined in preceding aspects A_2 and A_4, is/are consistent. According to further exemplary embodiments, if the conditions are not met, an alert is issued.

Compared to current conventional techniques for user identity verification, the above proposed exemplary embodiments, which may also be referred to as "cyber-physical technique for two factor authentication (2FA)", have the advantage of being more secure due to the location dependence introduced in aspect A2 and the physical nature of the auxiliary, i.e. second, communication channel CH2 in aspect A_4. For example, compared to some smartphone 2FA authentications, exemplary embodiments are simpler to use because they do not require user input. And compared to conventional smartcards, the exemplary embodiments allow for easier removal of an authenticated device, which may be lost or hacked, by remotely deactivating that device.

Further exemplary embodiments using said second communications channel CH2 (FIG. 6B) facilitate one or more of the following aspects: authentication and encryption-based applications, secure content sharing, and automation of external services using a network-centric, ultra-secure procedure in which no other sensors are required to authenticate mobile devices against adversaries. In supporting these interactive applications in a seamless manner, exemplary embodiments provide value in extending mm-wave networks 1000, 1000' into a digital value platform for smart environments.

In the following, further aspects of e.g. authentication mechanisms are explained with reference to the flow chart of FIG. 11B and to the scenario of FIG. 7. According to further exemplary embodiments, said first radio device 10 (FIG. 7) is configured to, cf. FIG. 11B: determine 210, using said first communications channel CH1 (FIG. 6A), a first secret secr1, which is a shared secret common to the first radio device 10 and said second radio device 20, to determine 212, depending on said first secret secr1, a second secret secr2, and to transmit 214 first information inf1 characterizing said second secret secr2 to said second radio device 20 (FIG. 7) using said second communications channel CH2 (FIG. 6B). As an example, said first information inf1 may be identical to said second secret secr2 or may be derived therefrom, may e.g. be a part of said second secret.

Using said first information inf1, according to further exemplary embodiments, said second radio device 20 may determine whether the first radio device 10 is in possession of the shared first secret secr1, cf. the optional step 216. As an example, the second radio device 20 may determine a hash value based on said first, shared secret secr1, and compare said hash value with said received first information inf1. If these values are identical, the first radio device 10 is authenticated. Otherwise, an error reaction may be initiated.

According to further exemplary embodiments, said determining 210 of said first secret secr1, which may e.g.

represent a shared session key for a communications session of devices 10, 20, may comprise a, preferably pre-committed, ephemeral key agreement procedure. According to further exemplary embodiments, conventional key exchange mechanisms using said first communication channel CH1 may be used for such key agreement procedure, e.g. according to an IEEE 802.11—based standard such as e.g. WPA3 ("WiFi Protected Access Version 3"). After the key agreement procedure, both devices 10, 20 possess the shared first secret secr1.

According to further exemplary embodiments, said second secret secr2 may e.g. represent a one-time secret or key, and may e.g. be deterministically derived from said first secret secr1. According to further exemplary embodiments, said second secret secr2 may be determined by applying a hash function, e.g. SHA (secure hash algorithm)-256 or the like, to the first secret secr1. As an example, the so obtained hash value (or a part thereof) may be used as said second secret secr2.

According to further exemplary embodiments, said second radio device 20 is configured to wirelessly exchange data with said first radio device 10 using said first communications channel CH1 and/or said second communications channel CH2. Preferably, as explained above, the first communications channel CH1 may be used for a key agreement procedure, and the second communications channel CH2 may be used as a further, auxiliary communications channel to at least temporarily exchange data, particularly to transmit secret information or information to be protected from attackers, such as e.g. the first information, to the second radio device 20. In other words, according to preferred embodiments, the second communications channel CH2 may be used to facilitate authentication processes. Advantageously, its use enables increased security against attackers, as compared to the first communications channel CH1 (alone).

According to further exemplary embodiments, optionally, using mm-wave passive localization techniques is also possible, wherein a distance and angle between the first radio device 10 (FIG. 7) and the second radio device 20 can be inferred with high distance and angular precisions. Such optional localization may e.g. be performed in course of step 210, or prior to said step 210, of FIG. 11B.

According to the inventors' analysis, according to further exemplary embodiments, a reflective element 110' (FIG. 1B) comprising liquid crystal may be used to implement an electrically controllable surface portion of said at least one reflective surface 110a, wherein said reflective properties RP may be influenced by controlling an operation of said liquid crystal. In this regard, FIG. 8A schematically depicts a side view of a reflective element 1100 according to further exemplary embodiments in a first operational state, wherein FIG. 8B schematically depicts said reflective element 1100 of FIG. 8A in a second operational state.

According to further exemplary embodiments, said reflective element 1100 comprises two electrodes 1102 for receiving a control voltage (also cf. control signal CS' of FIG. 1B, and reference sign cv of FIG. 8B) and a liquid crystal cavity 1104 between said two electrodes 1102. By applying and/or varying the control voltage cv to said electrodes 1102, the reflective properties RP (FIG. 1B) of the reflective element 1100 comprising liquid crystal may be controlled, e.g. for modulating reflected electromagnetic waves A1" (FIG. 1B). In other words, said second communications channel CH2 (FIG. 6B) may also be provided using the embodiments of the reflective element 1100 explained with reference to FIG. 8A, 8B.

According to further exemplary embodiments, liquid crystals of said reflective element 1100 may consist of elongated rod-like molecules and may exhibit different electrical characteristics depending e.g. on how an electromagnetic field is incident on the molecules owing to anisotropy.

According to further exemplary embodiments, the orientation of a liquid crystal bulk can be changed by external electric fields (e.g., said control voltage cv to the electrodes 1102) and/or by encapsulating surface anchoring.

According to further exemplary embodiments, a microstrip line topology may be used to build a "programmable" reflective element 1100 on a metasurface. According to further exemplary embodiments, the principal structure may be composed of a substrate 1106a, 1106b, two biasing electrodes 1102, a liquid crystal cavity 1104, encapsulated e.g. in said microstrip line topology mentioned above.

According to further exemplary embodiments, a part (e.g., an upper part 1106a (FIG. 8A)) of the substrate may be completely metalized to form a ground plane.

According to further exemplary embodiments, the liquid crystal (LC) cavity 1104 may be formed between the substrate and the ground plane with the aid of spacers 1108. According to further exemplary embodiments, a modulated external electric field to control the bulk orientation can be maintained simply by applying modulated voltage cv (FIG. 8B) between said two electrodes 1102 confining the LC. According to further exemplary embodiments, in the absence of a bias voltage cv (cf. the state of FIG. 8A) or for the pre-alignment of the molecules, surface anchoring may affect the reflective properties. In other words, without any bias voltage cv, according to further exemplary embodiments, molecules may align perpendicular to the field between the electrodes 1102. In this case, the effective relative permittivity of the liquid crystal bulk is equal to εper, which corresponds with a first value of the reflective properties (e.g., impedance) of the reflecting surface 110a provided by said reflective element 1100.

According to further exemplary embodiments, when a bias voltage cv is applied to said electrodes 1102 (cf. the state of FIG. 8B), molecules of said LC begin to turn leading to a variation in the effective permittivity of the liquid crystal bulk. If the voltage is increased further, molecules may orient along the bias field lines and parallel to the field and hence is almost equal to εpar, which corresponds with a second value of the reflective properties (e.g., impedance) of the reflecting surface 110a provided by said reflective element 1100.

According to further exemplary embodiments, by modulating the biasing voltage cv, it is possible to rearrange the crystal orientation and overall effective permittivity of the reflective surface 110a yielding in modulating and/or coding possibility for e.g. reflected mm-waves A1" (FIG. 1B) from such a surface (portion) containing LC crystals.

According to the inventors' analysis, according to further exemplary embodiments, a reflective element 1100' comprising graphene elements, particularly graphene nanoribbons 1110 (ribbon-shaped structures or strips, respectively, with a width of e.g. less than 50 nanometers (nm)), may be used to implement an electrically controllable surface portion of said at least one reflective surface 110a, wherein said reflective properties RP (cf. FIG. 1B) may be influenced by controlling an operation and/or state of said graphene elements 1110.

According to further exemplary embodiments, said reflective element 1100' (FIG. 9) comprising graphene elements comprises a plurality of graphene nanoribbons.

According to further exemplary embodiments, graphene plasmonic nanostructures, which may comprise said graphene nanoribbons 1110, may enable subwavelength confinement of electromagnetic (EM) waves, e.g. from the mid-infrared down to the terahertz (THz) frequencies. By exploiting the spectrally varying EM wave scattering phase at the vicinity of the resonant frequency of the plasmonic nanostructure, according to further exemplary embodiments, it is possible to control the angle of reflection of an incoming EM wave A5.

According to further exemplary embodiments, it is proposed to provide an aperiodic array of graphene nanoribbons 1110 of varying widths as multiplied wavelength of the operating EM waves. According to further exemplary embodiments, each nanoribbon may form a plasmonic resonator, which can effectively produce a scattering phase (e.g., between 0 and $-\pi$). According to further exemplary embodiments, the graphene nanoribbons 1110 are made and/or arranged on a SiO2 (silicon dioxide) substrate, preferably with an interconnecting electrode 1114 serving as a "top gate" for inducing high doping in said graphene by introducing biasing potential and possibility to e.g. program the scattering phase of a graphene plasmonic resonator, i.e. to code it by modulating the biasing signal Vb. According to further exemplary embodiments, the substrate 1112 may be arranged on an electrically conductive layer 1116 (e.g., a film 1116 of evaporated gold or similar) serving as a bottom electrode where the second pole of the biasing potential Vb is connected.

According to further exemplary embodiments, a reflective element with an electronically controllable impedance may be provided, which may e.g. comprise a plurality of varactor diodes and/or PIN diode switches and/or ferro-electric films and/or MEMS (micro electro mechanical system) devices and/or a combination of these elements. These are further examples for implementing said at least one reflective surface with electronically controllable reflective properties according to further exemplary embodiments.

Figure 11B:
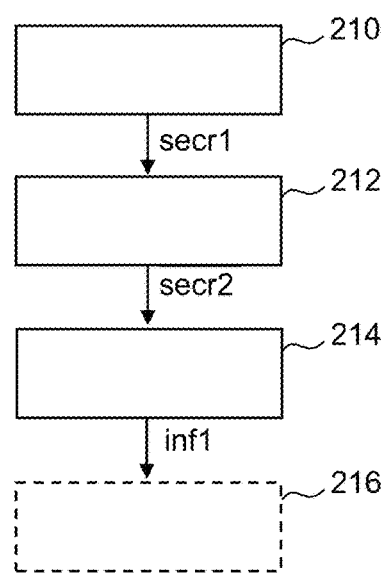
Figure 11C:
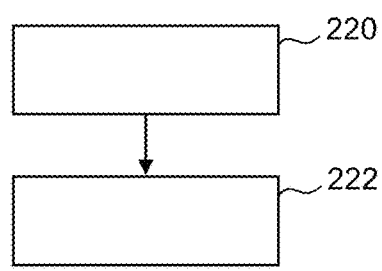

Further exemplary embodiments, cf. FIG. 11C, relate to a method of operating an apparatus 100, 100' (FIG. 1A, 1B) comprising at least one reflective surface 110a configured to reflect electromagnetic waves A1, wherein a) at least one portion of said reflective surface is movable, wherein apparatus 100, 100' at least temporarily drives, cf. step 220 of FIG. 11C, a movement of said at least one movable portion of said reflective surface 110a, and/or wherein b) reflective properties RP (FIG. 1B) of a or said at least one portion of said reflective surface 110a with respect to said electromagnetic waves A1 are electronically controllable, wherein said apparatus 100, 100' at least temporarily controls, cf. step 222 of FIG. 11C, said reflective properties RP of said at least one portion of said reflective surface 110a. According to further exemplary embodiments, one or more configurations as exemplarily described above with reference to FIG. 1A to 11B may be used for performing at least one of said steps 220, 222 of FIG. 11C. As an example, for step 220, the configuration of FIG. 1A and/or FIG. 2 and/or FIG. 3 and/or FIG. 4A, 4B may be used. As an example, for step 222, the configuration of FIG. 1B and/or FIG. 8A, 8B and/or FIG. 9 may be used. Alternatively or additionally, according to further exemplary embodiments, for said step 222, at least one reflective element with an electronically controllable impedance may be used, which may e.g. comprise a plurality of varactor diodes and/or PIN diode switches and/or ferro-electric films and/or MEMS (micro electro mechanical system) devices and/or a combination of these elements.

The varactor and PIN diodes are typically known in the art as very fast electronic modules which in this arrangement according to further exemplary embodiments may be used to reconnect additional resonating circuits and modify the impedance on a controlled way. The use of MEMS devices in the impedance management according to further exemplary embodiments is utilizing physical displacement of the circuitry resonating components or its parts. By physical modulation of the resonating circuits according to further exemplary embodiments the impedance may be controlled.

The ferroelectric films according to further exemplary embodiments can be used as a structured patterns or just as single coating layer. According to further exemplary embodiments, the impedance may be modified by applying electric or magnetic field across the ferro-film to modify the surface impedance.

Further exemplary embodiments relate to a use of said apparatus 100, 100' according to the embodiments and/or of said method(s) according to the embodiments and/or of said (first) radio device 10 according the embodiments and/or of said (second) radio device 20 according the embodiments and/or of said system 1000, 1000' according to the embodiments for at least one of: a) performing encryption-based applications, b) authentication, c) two-factor authentication (2FA), d) secure content sharing, e) automating services, e.g. external services.

In the following, further aspects and exemplary embodiments are disclosed.

As mentioned above, mm-wave technology operates at high frequencies in the 30 GHz to 300 GHz range, with corresponding wavelengths between 1 mm-10 mm range. For indoors use, a 60 GHz band extends over 14 GHz of unlicensed spectrum. The wavelength at 60 GHz is around $\lambda=5$ mm, which presents opportunities to reliably resolve minute changes in the reflectivity of objects and materials. Further, small objects may represent better reflectors of the fine 60 GHz wavelength compared to e.g. sub-6 GHz WiFi frequencies. For instance, a plate has a radar cross section (RCS) given by $\sigma=4\pi A^2/\lambda^2$. For a 10 cm-side square, the RCS expressed in decibels square meter is around 16 dBsm for a 60 GHz carrier, compared to −4 dBsm for a Wi-Fi carrier.

In view of this, advantageously, according to further embodiments, the principle according to the embodiments may e.g. be used to conduct space auditing for indoor environments at unprecedented scales, and the combined effect of fine reflectivity resolution and enhanced RCS of typical small objects at 60 GHz presents a significant potential for indoor sensing.

According to further aspects, the physical channel properties of a radio channel associated with (e.g., 5G) mm-waves can constrain adversaries to specific physical positions (i.e. range & orientation) with respect to communication devices 10, 20 (FIG. 5) to be attacked.

According to further aspects, it can be assumed that signal cancellation—or more generally, targeted manipulation of a reflected signal A1' towards an original transceiver 20—is only possible within a sufficiently tight spatial sector, i.e. around the line-of-sight (LOS) between said device 10, 20. According to further exemplary embodiments, this may imply an adversary model based on conventional in-band and auxiliary channel characteristics as follows, cf. the points B1, B2, B3 below:

B1) Passive eavesdropping may be assumed to be possible from arbitrary locations within the channel (i.e. typically room level as e.g. for ultrasound). For the system 1000, 1000' according to exemplary embodiments, this may include both in-band (data) communication (i.e., using the first channel CH1), e.g. during initialization/setup and auxiliary (kinetic) "sensing" (i.e., using the second channel CH2), e.g. from multi-path effects of both the original and the reflected signals.

B2) Complete (active) denial-of-service (DoS) may also be assumed to be possible from arbitrary locations in range, but may be detectable in the sense that communication is rendered impossible e.g. on the application level.

B3) Selective cancellation, manipulation, or injection of single packets or for single devices within the area may be assumed to be prohibitively difficult unless the adversary is physically in direct line-of-sight between the two communicating devices 10, 20 (i.e. a physical man-in-the-middle).

Given these assumed adversarial settings B1, B2, B3, according to further exemplary embodiments, an authentication protocol may be constructed and/or provided, even for the challenging combination of a modality that cannot be sensed by human users U (FIG. 7) and without directly receiving user-controlled input. This protocol may comprise at least one of the following steps a), b), c), d):

a) the first radio device 10 (FIG. 7) may request access to a service/resource mediated by the second radio device 20 (note that according to further exemplary embodiments, this step a) may e.g. be optionally be performed prior to step 210 of FIG. 11B), b) through pre-committed, ephemeral key agreement on the first communication channel CH1 (FIG. 6A) (also cf. step 210 of FIG. 11B), both devices 10, 20 create a shared session key secr1 that is confidential against passive eavesdroppers but could e.g. be subject to an active man-in-the-middle attack on the communication channel. Such key agreement is already supported in current IEEE 802.11 standards, particularly WPA3, which makes it likely that existing implementations in chipset firmware could be readily re-used.

c) In a further phase ("secondary verification phase"), a one-time secret secr2 deterministically derived from this shared session key may be modulated on the second communication channel CH2 (FIG. 6B), i.e. using modulated (metasurface) reflectivity on the first radio device 10 and therefore transmitted back to the second radio device 20 over mm-wave sensing. Based on the above adversarial model (cf. points B1, B2, B3), this transmission may potentially be overheard from arbitrary positions, but cannot be manipulated by any adversary not physically in line-of-sight between the devices 10, 20.

d) When the second radio device 20 receives the "auxiliary signal" of the first radio device 10, i.e. the signal that is transmitted via the second communication channel CH2, that matches expectation (i.e. the deterministic secret secr2), the second radio device 20 may grant the first radio device 10 access, e.g. to the requested service/resource.

In the following further aspects and advantages of exemplary embodiments are discussed.

Compared to systems e.g. related to ultrasonic positioning, (vibrational) modulation over mm-wave can be physically constrained with direction-of-arrival (DoA), and therefore be made even more resilient to various attacker locations. In the context of the above described embodiments related to authentication, the proposed solution e.g. leaves an attacker a single chance to guess the one-time secret secr2 to remain undetected in a man-in-the-middle attack on the first phase of said authentication. The probability for such an attack can be directly controlled through the length of the transmission in phase c), resulting in a $1/2^n$ attack success rate for n bits modulated on the second (auxiliary vibrational sensing) channel CH2.

Compared to passcode-based procedures, no user input is required for authentication according to exemplary embodiments.

According to further exemplary embodiments, the second radio device 20 (FIG. 7) may (continue to) track the first radio device 10, e.g. in order to determine a stoppage of the service, for instance, upon distance or orientation exceeding a certain limit. According to further exemplary embodiments, the first radio device 10 can seamlessly opt in and out of the service continually without user input.

According to further exemplary embodiments, the first radio device 10 may be very low cost (for example already existing haptic vibrations in smart phones can be used. In these cases, according to further preferred embodiments, an existing vibration motor may be controlled to modulate received EM waves).

According to further exemplary embodiments, the first radio device 10 may have a wireless interface 12 (cf. FIG. 1A) (e.g., Bluetooth or WiFi), and a vibration mechanism, cf. FIG. 2. According to further exemplary embodiments, the wireless interface 12 may be used to establish the physical vibration code, and the user U (FIG. 7) could push a (virtual) button to activate the code.

According to further exemplary embodiments, the first radio device 10 does not necessarily need to have mm-wave communication capability. According to further exemplary embodiments, the second device 20 (FIG. 7) may comprise mm-wave sensing capability, e.g. to receive the modulated reflected EM waves A1' (FIG. 5) from the first radio device 10. According to further exemplary embodiments, additional authentication like fingerprint verification could be implemented the first radio device 10 to provide additional security.

According to further exemplary embodiments, the communication system 1000, 1000' may be used to localize devices 10 with sub-meter accuracy, for example using a combination of spatial beamforming and time-of-arrival techniques. According to further exemplary embodiments, it may be possible to initiate authentication only if a device 10 is within some prescribed area (e.g., characterized by one or more angular and/or distance range(s)). According to further exemplary embodiments, higher-fidelity sensing using radar techniques over the mm-wave band may also be applied at the second radio device 20, e.g. to refine the initial communication system's localization estimates for enhanced operation.

The principle according to the embodiments can also be used a) in mm-wave networks to reduce a risk of successful beam-stealing attacks, b) to secure communication beams in an out-of-band fashion (with respect to the first communication channel CH1), particularly without requiring any modification to the current IEEE 802.11ad protocol.

The description and drawings merely illustrate the principles of exemplary embodiments. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of exemplary embodiments and the concepts contributed by the inventor(s) to furthering the art, and are to be construed as being without limitation to such specifically recited examples and conditions. Moreover, all statements herein reciting principles, aspects, and embodiments, as well as specific examples thereof, are intended to encompass equivalents thereof.

It should be appreciated by those skilled in the art that any block diagrams herein represent conceptual views of illustrative circuitry embodying exemplary embodiments. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

A person of skill in the art would readily recognize that steps of various above-described methods can be performed and/or controlled by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. Radio device comprising a radio interface configured to wirelessly exchange data with at least one further device, wherein said radio device comprises an apparatus comprising a reflective surface configured to reflect non-visible electromagnetic waves in a millimeter wave range having a radio frequency (RF) of 3 gigahertz or greater, wherein a reflective response of at least one portion of said reflective surface having liquid crystal or graphene elements with respect to said electromagnetic waves is electronically controllable, wherein said apparatus is configured to at least temporarily control said reflective response of said liquid crystal or graphene elements of said at least one portion of said reflective surface, wherein said radio device is configured to:

establish a first communications channel with said at least one further device using said electromagnetic waves, and establish a second communications channel with said at least one further device by at least temporarily controlling said reflective response of said liquid crystal or graphene elements of said at least one portion of said reflective surface to modulate information into the reflected electromagnetic waves by generating an electronic control signal to change a reflective property of said liquid crystal or graphene elements of said at least one portion of said reflective surface, wherein said radio device is configured to wirelessly exchange data with said at least one further device using said first communications channel to receive incoming data from said at least one further device and said second communications channel to transmit outgoing data to said at least one further device, wherein said radio device generates said outgoing data based on said incoming data.

2. The radio device according to claim 1, wherein said reflective surface comprising said graphene elements comprises a plurality of graphene nanoribbons.

3. The radio device according to claim 1, wherein said radio device is configured to: determine, using said first communications channel, a first secret, which is a shared secret common to the radio device and said at least one further device; determine, depending on said first secret, a second secret; and transmit first information characterizing said second secret to said at least one further device using said second communications channel.

4. System comprising a first radio device, wherein said first radio device is configured according to claim 3, and a second radio device, said second radio device comprising a transmitter configured to transmit said electromagnetic waves to said first radio device, a receiver configured to receive reflected modulated electromagnetic waves from said first radio device, wherein said second radio device is configured to wirelessly exchange data with said first radio device using said first communications channel and/or said second communications channel.

5. Method of operating said radio device of claim 1, wherein said radio device establishes the first communications channel with said at least one further device using said electromagnetic waves, and establishes the second communications channel with said at least one further device by at least temporarily controlling said reflective response of said at least one portion of said reflective surface.

6. System comprising a first radio device, wherein said first radio device is configured according to claim 1, and a second radio device, said second radio device comprising a transmitter configured to transmit said electromagnetic waves to said first radio device, a receiver configured to receive reflected modulated electromagnetic waves from said first radio device, wherein said second radio device is configured to wirelessly exchange data with said first radio device using said first communications channel and/or said second communications channel.

7. The system according to claim 6, wherein said first radio device is configured to: determine, using said first communications channel, a first secret, which is a shared secret common to the first radio device and said second radio device; determine, depending on said first secret, a second secret; and transmit first information characterizing said second secret to said second radio device using said second communications channel, wherein said second radio device is configured to receive, using said second communications channel, said first information from said first radio device, and to evaluate said received first information depending on said first secret.

8. Method of operating a system comprising a first radio device, wherein said first radio device is configured according to claim 1, and a second radio device, said second radio device comprising a transmitter configured to transmit said electromagnetic waves to said first radio device, and a receiver configured to receive reflected modulated electromagnetic waves from said first radio device, wherein said second radio device wirelessly exchanges data with said first radio device using said first communications channel and said second communications channel.

9. The method according to claim 8, wherein said first radio device determines, using said first communications channel, a first secret, which is a shared secret common to the first radio device and said second radio device; determines, depending on said first secret, a second secret; and transmits first information characterizing said second secret to said second radio device using said second communications channel, wherein said second radio device receives, using said second communications channel, said first information from said first radio device, and evaluates said received first information depending on said first secret.

10. Use of said radio device according to claim 1 for at least one of: a) performing encryption-based applications, b) authentication, c) two-factor authentication, d) secure content sharing, and e) automating services.

11. The radio device according to claim 1, wherein said reflective surface comprising said liquid crystal comprises: two electrodes configured to receive a control voltage, and a liquid crystal cavity filled with only liquid crystal bulk between said two electrodes.

12. The radio device according to claim 1, wherein:
said at least one portion of said reflective surface comprises said liquid crystal; and
said electronic control signal is configured to change a reflective property of said liquid crystal.

13. The radio device according to claim 1, wherein said radio device is configured to wirelessly exchange data with said at least one further device using said first communications channel and said second communications channel simultaneously.

* * * * *

UNITED STATES PATENT AND TRADEMARK OFFICE
CERTIFICATE OF CORRECTION

| | | |
|---|---|---|
| PATENT NO. | : 12,107,339 B2 | Page 1 of 1 |
| APPLICATION NO. | : 17/018154 | |
| DATED | : October 1, 2024 | |
| INVENTOR(S) | : Zoran Radivojevic et al. | |

It is certified that error appears in the above-identified patent and that said Letters Patent is hereby corrected as shown below:

On the Title Page

Item (54) and in the Specification, Column 1, Line 4, Remove "PRELIMINARY CLASS."

Signed and Sealed this
Seventeenth Day of December, 2024

Derrick Brent
*Acting Director of the United States Patent and Trademark Office*